United States Patent [19]

Kroniger

[11] 3,893,701
[45] July 8, 1975

[54] WHEEL SUSPENSION FOR VEHICLES WITH AN ELASTIC TOE-IN CHANGE

[75] Inventor: Wilhelm Kroniger, Munchingen-Kallenberg, Germany

[73] Assignee: Dr. Ing. h.c.F. Porsche Aktiengesellschaft, Germany

[22] Filed: Nov. 16, 1973

[21] Appl. No.: 416,519

[30] Foreign Application Priority Data
Nov. 17, 1972 Germany............................ 2256358

[52] U.S. Cl.............................. 280/124 A; 280/96.3
[51] Int. Cl................................................. B60g 3/28
[58] Field of Search.......... 280/124 A, 96.2 R, 96.1, 280/96.2 B, 96.3

[56] References Cited
UNITED STATES PATENTS
2,785,907   3/1957   Hutchens........................... 280/96.3

| | | | |
|---|---|---|---|
| 3,123,348 | 3/1964 | Hildebrandt..................... | 280/124 A |
| 3,229,783 | 1/1966 | Muller............................ | 280/124 A |

*Primary Examiner*—Philip Goodman
*Attorney, Agent, or Firm*—Craig & Antonelli

[57] ABSTRACT

A wheel suspension for vehicles which has an elastic toe-in change and approximately horizontal pivot axes of the guide members at the vehicle body; one guide arm which consists of a leaf spring is thereby connected with another relatively rigid guide arm to provide a relatively soft pivotal action by way of a joint located at the ends of the guide arms opposite their pivotal connection at the vehicle body.

8 Claims, 4 Drawing Figures

3,893,701

WHEEL SUSPENSION FOR VEHICLES WITH AN ELASTIC TOE-IN CHANGE

The present invention relates to a wheel suspension for vehicles having an elastic change in toe-in, with approximately horizontal pivot axes of the guide members at the vehicle body, whereby the guide arms are connected with the wheel carrier.

The faster a vehicle moves through a curve, the larger become the lateral forces engaging at the wheels, i.e., the larger become the inclined running angles, that is, the angles formed between the vehicle's actual driving direction and its original driving direction, from which it follows that owing to a large inclined or oblique running angle of the wheel which results while driving through a curve, a lateral force increasing up to a maximum becomes possible.

The present invention is now concerned with the task to provide a wheel suspension of the aforementioned type, in which the wheel position is elastically changeable in the direction of toe-in, while driving through a curve, and a larger inclined running angle is attained at the wheel on the outside of the curve without causing the entire vehicle to position itself at an excessive inclination to the driving direction. A toe-out wheel adjustment is to be prevented during braking and accelerations.

The underlying problems are solved according to the present invention in that the one guide arm consists of a leaf spring and is connected with a further rigid guide arm and in that both guide arms are pivotally connected relatively softly by way of a joint on the side opposite the pivotal connection of the guide members at the vehicle body or the like.

It is achieved in an advantageous manner with the wheel suspension according to the present invention that a disturbing turning-in (over-steering) of the vehicle is reduced in case of steering into a curve and in case of a change in load while driving through a curve.

An advantageous further development of the wheel suspension according to the present invention resides in that the guide arm constructed as leaf spring is rotatable about a vertical pivot axis of an elastic bending or flexing joint which is formed by a connection of the two free guide arm ends.

Furthermore, provision is made according to the present invention that the vertical pivot axis of the joint is located in the wheel center plane extending through the point of contact of the wheel with the road surface.

It is achieved thereby in an advantageous manner that no moments can occur at the wheel for changing the wheel position in the direction of toe-in during braking and accelerating.

Furthermore, provision is made according to the present invention that the guide arm is pivotally connected at the rigid guide arm by means of a hinge or pivot joint and is rotatable about a vertical pivot axis.

In a wheel suspension with a longitudinal guide member construction, provision is made according to the present invention that the guide arm near the wheel and constructed as leaf spring is supported with respect to the second rigidly constructed guide arm by way of an elastic support element.

According to a further embodiment of the present invention, provision is made in a wheel suspension with a cross guide member construction that the forward guide arm consists of a leaf spring, is secured at the wheel carrier and is pivotal about a vertical pivot axis arranged in the wheel center plane by way of further guide arms pivotally secured at the wheel carrier.

These and further objects, features and advantages of the present invention will become more apparent from the following description when taken in connection with the accompanying drawing which shows, for purposes of illustration only, several embodiments in accordance with the present invention, and wherein.

Figure 1:
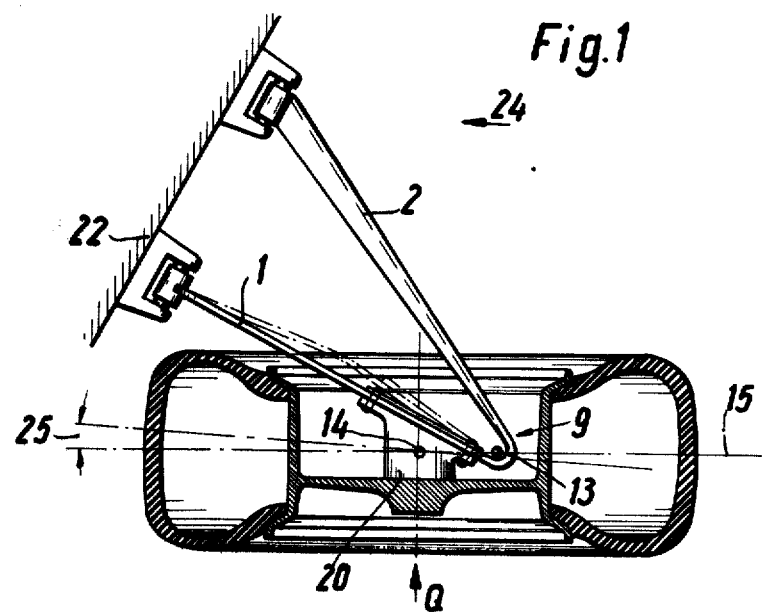
FIG. 1 is a plan view of a wheel suspension in accordance with the present invention, illustrating the guide member construction provided with an elastic bending joint.

Referring now to the drawing wherein like reference numerals are used throughout the various views to designate like parts, the wheel suspensions of FIGS. 1 to 4 are designed for a rear wheel suspension and consist of the guide arms 1 to 8, for an inclined guide structure (FIG. 1), a cross guide structure (FIG. 3), and a longitudinal guide structure (FIG. 4), which are pivotally connected or secured at the vehicle body or the like schematically indicated at 22 as well as at the wheel carrier 20. The same principle which includes a leaf spring as guide arm, is also applicable to front wheel axles by a corresponding construction of the wheel suspension.

The guide structure consists of a guide arm 1, 3, 5 and 7 near the wheel and of a further angularly disposed support guide arm 2, 4, 6 and 8 secured thereat or coordinated thereto. Both guide arms are connected with each other at an angle whereby the inner ends of the guide arms are held at the vehicle 22 in appropriate joints of any conventional construction.

The guide arm 1, 3, 5, and 7 nearer the wheel consists of a leaf spring and is secured at the wheel carrier 20. Preferably, the leaf spring is formed of a rectangular cross section.

It can be seen from FIG. 1 that with the inclined guide structure the guide arm 1 nearer the wheel is secured at the wheel carrier 20 and is so connected with the further angularly disposed guide arm 2 that a joint generally designated by reference numeral 9 having a vertical pivot axis 13 results therefrom. The pivot axis 13 is located in the wheel center plane 15 passing through the point of contact 14 of the wheel with the road surface. As a result thereof, no moments can arise at the wheel during braking and during acceleration so that a disadvantageous toe-in change of the wheels is prevented thereby in this case. When driving through a curve, the leaf spring is subjected to a bending action, indicated in dash and dot lines, in case of a relatively large lateral force and the wheels adjust themselves elastically in the direction of toe-in so that a defined change in toe-in 25 (FIG. 1) results. The return of the wheels into their base position takes place automatically when driving straight.

Figure 2:
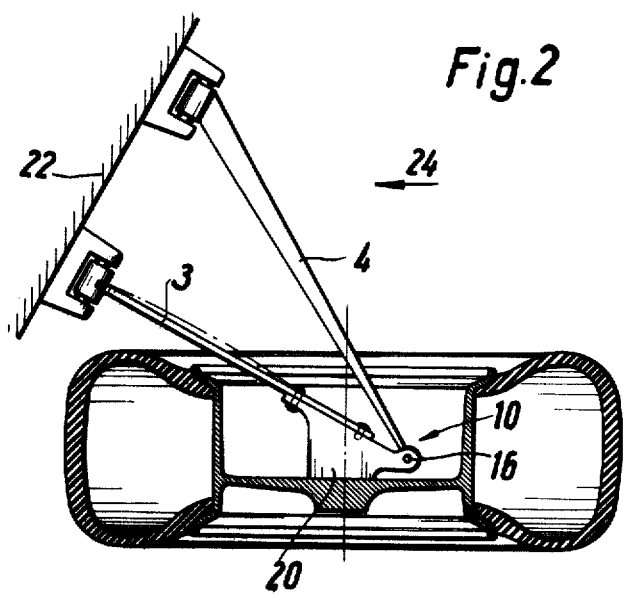
FIG. 2 is a plan view on a modified embodiment of a wheel suspension in accordance with the present invention, similar to FIG. 1, in which the guide member construction is provided with a pivot joint.

As is illustrated in FIG. 2, the guide arm 3 near the wheel which is constructed as leaf spring is pivotally secured at the wheel carrier 20. The angularly disposed second guide arm 4 is pivotally supported at the wheel carrier 20 in a pivot or hinge joint generally designated by reference numeral 10. The joint 10 consists of a rubber bearing with a joint bolt or pin. Under the effect of large lateral forces, the leaf spring again is flexed and bends through corresponding to the dash and dot line, for which purpose the wheel carrier 20 is able to move about the pivot joint 10.

Figure 3:
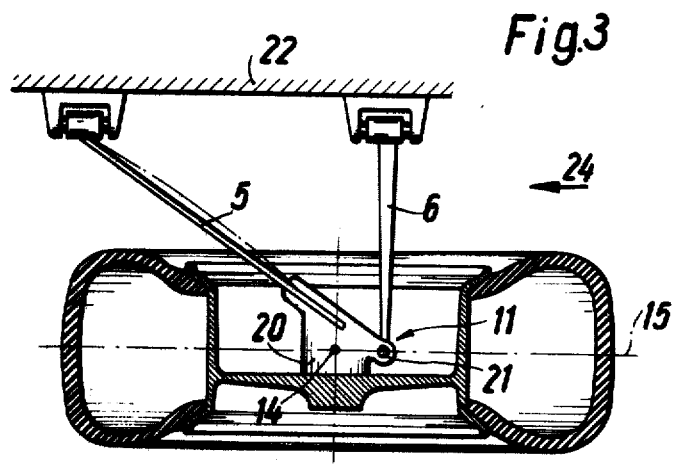
FIG. 3 is a plan view on a still further modified embodiment of a wheel suspension in accordance with the present invention of cross guide member construction.

A cross guide structure is illustrated in FIG. 3 whose one guide arm 5 consisting of a leaf spring is secured in the wheel carrier 20 whereby an angularly disposed upper guide arm 6 is supported at the wheel carrier 20 by way of a ball joint and a further guide arm (not shown) which is disposed therebelow, is also supported at the wheel carrier 20 by way of a ball joint (not shown). The leaf spring is able to flex through along the dash and dot line under the influence of large lateral forces.

Figure 4:
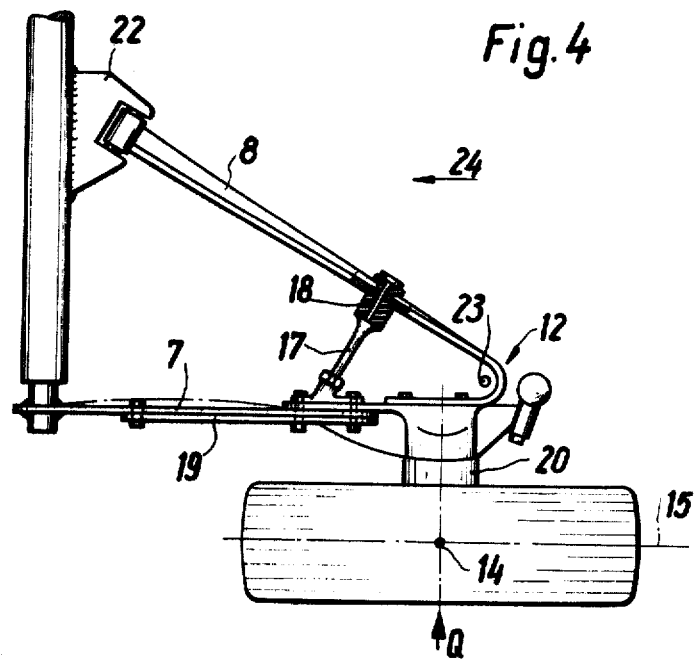
FIG. 4 is a plan view on a still further modified embodiment of a wheel suspension according to the present invention equipped with a longitudinal guide member construction.

A longitudinal guide structure is illustrated in FIG. 4 in which the guide arm 7 near the wheel respectively the leaf spring is secured at the wheel carrier 20. The leaf spring is again able to flex through along the dash and dot line. The angularly disposed further guide arm 8 is also secured at the wheel carrier 20. A support element 17 is provided between the wheel carrier 20 and the angularly disposed guide arm 8 which is elastically secured at the angularly disposed support guide arm 8 under interposition of rubber elements 18. A large elasticity is thus achieved in case of positional changes of the wheel in the direction of toe-in and a small elasticity in case of a wheel positional change in the direction of toe-out. Any occurring moment during braking as well as during acceleration due to the lever arm between the point of contact 14 of the wheel with the road surface and the vertical pivot axis 23 of the wheel, is absorbed by the support with respect to the guide arm 8. By an appropriate corresponding selection of the rubber hardness and construction of the support, the elastic toe-in change can be influenced in a defined manner. An adjusting mechanism 19 of any conventional type for adjusting the base position of the wheel is provided at the leaf-spring guide arm 7. The vertical pivot axes 13, 16, 21 and 23 of the joints 9, 10, 11 and 12 are arranged in every case to the rear of the point of contact 14 of the wheel with the road surface, as viewed in the driving direction, so that a lever arm results between the point of contact 14 and the pivot axes whereby with a force Q, a turning-in or steering-in moment occurs at the wheel.

The wheel suspension of the present invention operates in such a manner that as a result of a large lateral force which occurs when driving through a curve, a force Q acts on the wheel, whereby the wheel is able to rotate or pivot elastically about the respective vertical pivot axes of the joints and the leaf spring undergoes thereby a flexing. Such an elastic toe-in change 25 produces an increased inclined running angle of the wheel and therewith an increasing lateral guide force without achieving thereby an excessive inclined position of the vehicle toward the driving direction.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A wheel suspension for vehicles having an elastic toe-in change which comprises guide means including guide arm means pivotally connected at a relatively fixed part and operatively connected with a wheel carrier means for guiding the wheel with respect to the relatively fixed part of the vehicle, characterized in that one guide arm consists of a leaf spring and is operatively connected with a relatively rigid guide arm means, and in that said guide arm means are connected with each other at the side thereof, opposite the pivotal connection of the guide means at the relatively fixed part, by way of a joint means effectively providing a substantially vertical pivot axis located substantially in the wheel center plane passing through the point of contact of the wheel with the road surface to effect a defined toe-in of the wheel when lateral forces occur and to prevent changes in wheel position in the toe-out direction when peripheral forces occur.

2. A wheel suspension according to claim 1, characterized by guide means having approximately horizontal pivot axes at the relatively fixed vehicle part.

3. A wheel suspension according to claim 2, characterized in that the relatively fixed part is the vehicle body.

4. A wheel suspension according to claim 1, characterized in that the substantially vertical pivot axis about which said one guide arm means, constructed as a leaf spring, is pivoted comprises an elastic bending joint means which is effectively constituted by a connection of the two free ends of the guide arm means.

5. A wheel suspension for vehicles including a cross guide means according to claim 1, characterized in that the forward guide arm means consists of a leaf spring, is secured at the wheel carrier means and is pivotal by way of further guide members pivotally secured at the wheel carrier means.

6. A wheel suspension according to claim 5, characterized in that the leaf spring is secured in the wheel carrier means.

7. A wheel suspension according to claim 1, characterized in that the joint means provides a relatively soft pivot action.

8. A wheel suspension for vehicles according to claim 1, characterized in that said one guide arms means is secured at the wheel carrier means and is pivotal by way of further guide members pivotally secured at the wheel carrier means.

* * * * *